(12) United States Patent
Restorff et al.

(10) Patent No.: US 11,457,110 B2
(45) Date of Patent: *Sep. 27, 2022

(54) INTERACTIVE VOICE RESPONSE SYSTEM WITH A REAL TIME CONVERSATION SCORING MODULE

(71) Applicant: Bank of America Corporation, Charlotte, NC (US)

(72) Inventors: Christopher Keith Restorff, Carrollton, TX (US); Joshua Maki, Frisco, TX (US); Emad Noorizadeh, Plano, TX (US); Ramakrishna R. Yannam, The Colony, TX (US); Jie Zhang Nissel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,357

(22) Filed: Oct. 19, 2021

(65) Prior Publication Data
US 2022/0103688 A1     Mar. 31, 2022

Related U.S. Application Data

(63) Continuation of application No. 17/001,824, filed on Aug. 25, 2020, now Pat. No. 11,201,966.

(51) Int. Cl.
*G10L 15/00* (2013.01)
*H04M 3/523* (2006.01)
(Continued)

(52) U.S. Cl.
CPC ....... *H04M 3/5232* (2013.01); *G10L 15/1815* (2013.01); *G10L 25/63* (2013.01); *H04M 3/5166* (2013.01)

(58) Field of Classification Search
CPC .............. H04M 3/5232; H04M 3/5166; G10L 15/1815; G10L 25/63
(Continued)

(56) References Cited

U.S. PATENT DOCUMENTS 9,413,891 B2     8/2016 Dwyer et al.
9,690,775 B2 *   6/2017 Fink .................. G06F 40/30
(Continued)

*Primary Examiner* — William J Deane, Jr.
(74) *Attorney, Agent, or Firm* — Weiss & Arons LLP; Michael A. Springs, Esq.

(57) ABSTRACT

An interactive voice response system for interpreting sentiment of a conversation in real time is provided. The system may include a receiver. The receiver may be operable to receive a plurality of sentiment signals and a first portion of a conversation. The first portion of the conversation may include a plurality of interaction pairs. Each interaction pair may include an utterance and a system response. The system may include an utterance sentiment category determination module that may be operable to determine a sentiment category for each utterance. The system may include a sequential module. The sequential module may determine a conversation sentiment category based on the utterance sentiment categories and the order in which the utterance sentiment categories are received. The system may include an output module. The output module may output the conversation sentiment category. The conversation sentiment category may be used to determine a future system response.

18 Claims, 11 Drawing Sheets

EXAMPLE OF CONVERSATION SCORE — 102

| | TEXT/GESTURE | UTTERANCE SENTIMENT | CONVERSATION SENTIMENT |
|---|---|---|---|
| 104 | Text: I lost my debit card and requested a replacement. It arrived yesterday but my last name is misspelled. | DeclareProblem | Normal |
| 106 | Text: Can I get a new replacement card overnighted to me? | Normal | Normal |
| 108 | Gesture: Replace my card | Normal | Normal |
| 110 | Text: I just received a new replacement card but my last name is misspelled. | DeclareProblem | Negative |

(51) Int. Cl.
   *G10L 15/18* (2013.01)
   *G10L 25/63* (2013.01)
   *H04M 3/51* (2006.01)

(58) Field of Classification Search
   USPC .................. 704/275, 27, 28; 379/265.01
   See application file for complete search history.

(56) References Cited

U.S. PATENT DOCUMENTS

| | | | |
|---|---|---|---|
| 9,922,649 | B1 | 3/2018 | LoRe et al. |
| 10,091,355 | B2 | 10/2018 | Flores et al. |
| 10,410,633 | B2 | 9/2019 | Lore et al. |
| 10,735,586 | B1 * | 8/2020 | Johnston ................ G06Q 30/01 |
| 10,878,444 | B2 | 12/2020 | Perkins et al. |
| 10,984,034 | B1 * | 4/2021 | Sandland .............. G10L 15/183 |
| 11,093,533 | B2 * | 8/2021 | Ezen Can ............. G06N 20/00 |
| 2012/0197903 | A1 | 8/2012 | Lu et al. |
| 2014/0254775 | A1 | 9/2014 | O'Connor et al. |
| 2015/0371278 | A1 | 12/2015 | Soni et al. |
| 2016/0042371 | A1 | 2/2016 | Klemm |
| 2016/0378569 | A1 * | 12/2016 | Ristock ................ H04M 3/523 718/104 |
| 2017/0366317 | A1 | 12/2017 | Farkas et al. |
| 2019/0149488 | A1 | 5/2019 | Bansal et al. |
| 2019/0215249 | A1 * | 7/2019 | Renard ............... H04L 65/1066 |
| 2019/0347355 | A1 | 11/2019 | Zhang et al. |
| 2019/0349321 | A1 | 11/2019 | Cai et al. |
| 2020/0125966 | A1 | 4/2020 | Dow et al. |
| 2020/0134647 | A1 | 4/2020 | Chahal |
| 2020/0293722 | A1 | 9/2020 | Song |
| 2021/0081293 | A1 * | 3/2021 | Sahni .................. G06F 3/04845 |
| 2021/0082454 | A1 | 3/2021 | Pandey et al. |
| 2021/0118323 | A1 | 4/2021 | Quy |
| 2021/0151037 | A1 | 5/2021 | Christensen et al. |
| 2021/0358488 | A1 * | 11/2021 | Iyer ......................... G10L 15/22 |

* cited by examiner

EXAMPLE OF CONVERSATION SCORE — 102

| TEXT/GESTURE | UTTERANCE SENTIMENT | CONVERSATION SENTIMENT |
|---|---|---|
| 104 — Text: I lost my debit card and requested a replacement. It arrived yesterday but my last name is misspelled. | DeclareProblem | Normal |
| 106 — Text: Can I get a new replacement card overnighted to me? | Normal | Normal |
| 108 — Gesture: Replace my card | Normal | Normal |
| 110 — Text: I just received a new replacement card but my last name is misspelled. | DeclareProblem | Negative |

FIG. 1

| Source | Sentiment Signal | Examples |
|---|---|---|
| Utterance sensitive words/features/ concepts | toxic | Utterance: "Just * * * * * * * * * * * *" (expletives deleted) |
| | negation | Utterance: "You are not helpful" |
| | **** (expletives deleted) | Utterance: "Your service is terrible", "clearly your bad at it" |
| | rejection | Utterance: "no" |
| | urgent | Utterance: "It is urgent, please heeelp" |
| | mistake | Utterance: "You are wrong", "What if you are wrong" |
| | lost | Utterance: "I lost my job recently, please help" |
| | understand | Utterance: "You don't understand" |
| | affirm | Utterance: "Yes" |
| | shock | Utterance: "omg" |

FIG. 2A

| Source | Sentiment Signal | Examples |
|---|---|---|
| Long Utterances with emotions | Financial Difficulty | Utterance: "Is it possible to please remove the recent late charge? I inadvertently didn't get my payment submitted on time." |
| | Disappointed | Utterance: "I am disappointed in the lack of communication with this money order hold of $850 on my account and no explanation. I will withdraw my wife and funds of approximately 300k to another bank. I was only keeping my funds here because I like being a loyal customer but I see this is not mutual. Thank you up to this point. |
| | Unemployment | Utterance: "I'm unemployed at the moment." "Can you please waive the 4 overdraft fees I have? I'm unemployed at the moment." |
| | Family Loss | Utterance: "My husband has passed away and I need to change all debit or charge cards to mine in our joint account so I can pay bills. I need support to do this. How do I proceed?" |
| | Health Problem | Utterance: "I was paying my health insurance and something happened with my credit card and they switched it out for me. Now I received a message from my insurance that I haven't paid in the last two months. I am out of the country and I don't have access to my folder or anything for my insurance. Can you please connect this account to what I was paying before you changed my credit card. I did video vendor just connect it to the insurance to the insurance and I will need 3 payments made with the amount I was paying." |

FIG. 2B

| Source | Sentiment Signal | Examples |
|---|---|---|
| Customer Repeat | Repeated Utterances | 100% Repeat from previous utterances. |
| | Partially Repeated Utterances | Utterance is partially matching the previous utterances. |
| | Similar Utterances | Similarity check by calculating the cosine similarity. |
| Response Repeat | Response-Repeated | Repeated response. |
| Response Negation/ Rejection | Response-NotUnderstand | Response: "I didn't quite get that." |
| | Response-StillLearning | Response: "I am still learning about..." |
| | Response-CannotProcess | Response: "We can't process your request at this time" |

FIG. 2C

OUTPUT OF DEEP LEARNING IN ORDER TO LABEL THE INCOMING UTTERANCES ⎯502

| Rank | Previous | Function | Category | Domain | Signal | Enabled |
|---|---|---|---|---|---|---|
| 1 | 1 | check_previous_intent | | UNKNOWN_INTENT, 'SI_HELP_SUGGESTIONS', "SI_CONTACT_US,CONTACT_US","FAQ_SMALLTALK_USER_******_ERICA","FAQ_SMALLTALK_WHAT_TO_DO_IF_ERICA_MADE_A_MISTAKE","FAQ_SMALLTALK_K_USER_LOVES_ERICA","FAQ_SMALLTALK_ERICA_ROCKS", "others_intents"(expletives deleted) | Signal=Preintent_+intent, Signal=Preintent_O therintents | TRUE |
| 2 | 1 | previous intent status | | 'start', 'incomplete', 'fulfilled' | | TRUE |
| 3 | 1 | check_previous_intent_status | negation | 'not', '****', 'doesn', 'didn', 'wasn', 'don', 'can/t', 'ain', 'haven', 'wont', 'aren', 'never', 'shouldn', 'nobody', 'but' (expletives deleted) | | TRUE |
| 4 | 0 | check input mode | | 'gesture', 'text', 'voice' | | TRUE |
| 5 | 1 | input_from_response | | 'yes', 'no' | | TRUE |
| 6 | 1 | input_repeated | repeat | 'repeated', 'partial-match', 'similar' | | TRUE |
| 7 | 0 | input_toxic | toxic | * * * * * * * * * * * * *(expletives deleted) | | TRUE |
| 8 | 0 | input_sentiment | negation | 'not', '**', 'doesn', 'didn', 'wasn', 'don', 'can/t', '*', 'haven', 'wont', 'aren', 'never', 'shouldn', 'nobody', 'nor', 'nothing', 'neither', 'none', 'rare', 'rarely'(expletives deleted) | | TRUE |
| 9 | 0 | input_sentiment | **(expletives deleted) | , () () () () (), (), (), (); (), (); (), (); 'faulty, (), (), (), (), (**)(expletives deleted) | | TRUE |

FIG. 5A

| Rank | Previous | Function | Category | Domain | Signal Name | Enabled |
|---|---|---|---|---|---|---|
| 10 | 0 | input_sentiment | rejection | 'no', 'no', 'none', 'neither', 'forget it' | | TRUE |
| 11 | 0 | input_sentiment | urgent | 'urgent', 'urgently', 'immediately' | | TRUE |
| 12 | 0 | input_sentiment | mistake | 'wrong', 'not right', '*****', 'mistake'(expletives deleted) | | TRUE |
| 13 | 0 | input_sentiment | lost | 'lost', 'loss' | | TRUE |
| 14 | 0 | input_sentiment | understand | 'understand', 'understood' — 506 | | TRUE |
| 15 | 0 | input_sentiment | customerservice | 'agent', 'talk to', 'speak with', 'representative', 'specialist', 'human', 'speak to' | | TRUE |
| 16 | 0 | input_sentiment | affirm | 'yes', 'ok', 'good', 'great', 'right', 'correct', 'yeah', 'yep', 'yea', 'okay', 'cool', 'nice' | | TRUE |
| 17 | 0 | input_sentiment | shock | 'omg' | | FALSE |
| 18 | 0 | input_sentiment | ***** | '*', '**', '***'(expletives deleted) | | FALSE |
| 19 | 0 | input_longutterance | EmpathyNeeded | | | FALSE |

FIG. 5B

LOGISTIC REGRESSION UTTERANCE SENTIMENT

|  | Precision | Recall | f1- Score | Support |
|---|---|---|---|---|
| Affirm | 1.00 | 1.00 | 1.00 | 34 |
| DelareProblem | 0.99 | 0.94 | 0.96 | 116 |
| ****(expletives deleted) | 1.00 | 0.89 | 0.94 | 47 |
| Mis-interpret | 0.91 | 0.84 | 0.87 | 37 |
| NeedHelp | 1.00 | 0.80 | 0.89 | 10 |
| Normal | 0.96 | 0.96 | 0.96 | 275 |
| Repeat | 0.93 | 0.96 | 0.95 | 137 |
| Resume | 0.97 | 1.00 | 0.98 | 355 |
|  |  |  |  |  |
| micro avg | 0.97 | 0.97 | 0.97 | 1011 |
| macro avg | 0.97 | 0.92 | 0.95 | 1011 |
| weighted avg | 0.97 | 0.97 | 0.97 | 1011 |

FIG. 6

CONVERSATION SENTIMENT CLASSIFICATION RESULTS

|  | Precision | Recall | f1- Score | Support |
|---|---|---|---|---|
| Negative | 0.93 | 0.93 | 0.93 | 339 |
| Normal | 0.96 | 0.96 | 0.96 | 672 |
|  |  |  |  |  |
| micro avg | 0.95 | 0.95 | 0.95 | 1011 |
| macro avg | 0.95 | 0.95 | 0.95 | 1011 |
| weighted avg | 0.95 | 0.95 | 0.95 | 1011 |

FIG. 7

INTERACTIVE VOICE RESPONSE SYSTEM WITH A REAL TIME CONVERSATION SCORING MODULE

CROSS-REFERENCE TO RELATED APPLICATION

This application is a continuation of U.S. patent application Ser. No. 17/001,824 filed on Aug. 25, 2020, now U.S. Pat. No. 11,201,966, and entitled "INTERACTIVE VOICE RESPONSE SYSTEM WITH A REAL TIME CONVERSATION SCORING MODULE" which is hereby incorporated by reference herein in its entirety.

FIELD OF TECHNOLOGY

Aspects of the disclosure relate to machine learning and artificial intelligence for an interactive voice response system.

BACKGROUND OF THE DISCLOSURE

Interactive voice response systems are computer-based systems that communicate with humans. The interactive voice response systems can receive inputs from the humans. These inputs may be received via a variety of channels, such as text input, audio/visual input and gesture input. The interactive voice response systems determine the intent—i.e., meaning and purpose—of the input. Based on the determined intent, the interactive voice response systems generate responses. These responses may be artificially-intelligent system responses. The interactive voice response systems present the responses to the humans using one or more of the variety of channels described above.

It would be desirable for the interactive voice response systems to determine and score the varying sentiment trajectory of the input. The varying sentiment trajectory can be understood to be the fluctuating feelings of the human during the conversation.

It would be further desirable for the interactive voice response system to determine and score the varying sentiment trajectory in real time as the conversation unfolds. It would be yet further desirable for such sentiment trajectory to be used to determine and select appropriate system responses.

SUMMARY OF THE DISCLOSURE

An interactive voice response system for interpreting sentiment of a conversation in real time is provided. Such a conversation may be conducted between a human and an interactive voice response system. Such a conversation may include a plurality of interaction pairs. Each interaction pair may include a human input, also referred to herein as an utterance, and a system response.

In order to understand the human sentiment of a conversation, and thereby score and categorize the sentiment and/or the sentiment trajectory of the conversation, the interactive voice response system may compute a score that measures the sentiment of each interaction pair of the conversation as it unfolds in real time. The score may consider the most recent interaction pair and the previous interaction pairs. The score may also consider the order in which the interaction pairs are received. As such, the score may measure the sentiment and/or sentiment trajectory of the conversation from normal to negative. Such a score may be computed at any time during the conversation.

The computed score may enable the interactive voice response system to determine at what point during the conversation the sentiment of the conversation changes—e.g., from normal to negative. This may be referred to herein as a pivot point of the conversation. Based on the computed score, the interactive voice response system may classify a sentiment category of the conversation. Examples of sentiment categories may include misinterpreted and normal. Such a sentiment category may also be determined at any time during the conversation.

The sentiment category determination may enable the generation of a sentiment-based, or a sentiment-trajectory-based, alert. The alert may be transmitted to one or more conversation managers or any other suitable stakeholders.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative diagram in accordance with principles of the disclosure;

FIGS. 2A, 2B and 2C show illustrative diagrams in accordance with principles of the disclosure;

FIGS. 5A and 5B show an illustrative diagram in accordance with principles of the disclosure;

FIG. 6 shows another illustrative diagram in accordance with principles of the disclosure;

FIG. 7 shows another illustrative diagram in accordance with principles of the disclosure.

DETAILED DESCRIPTION OF THE DISCLOSURE

Figure 3:
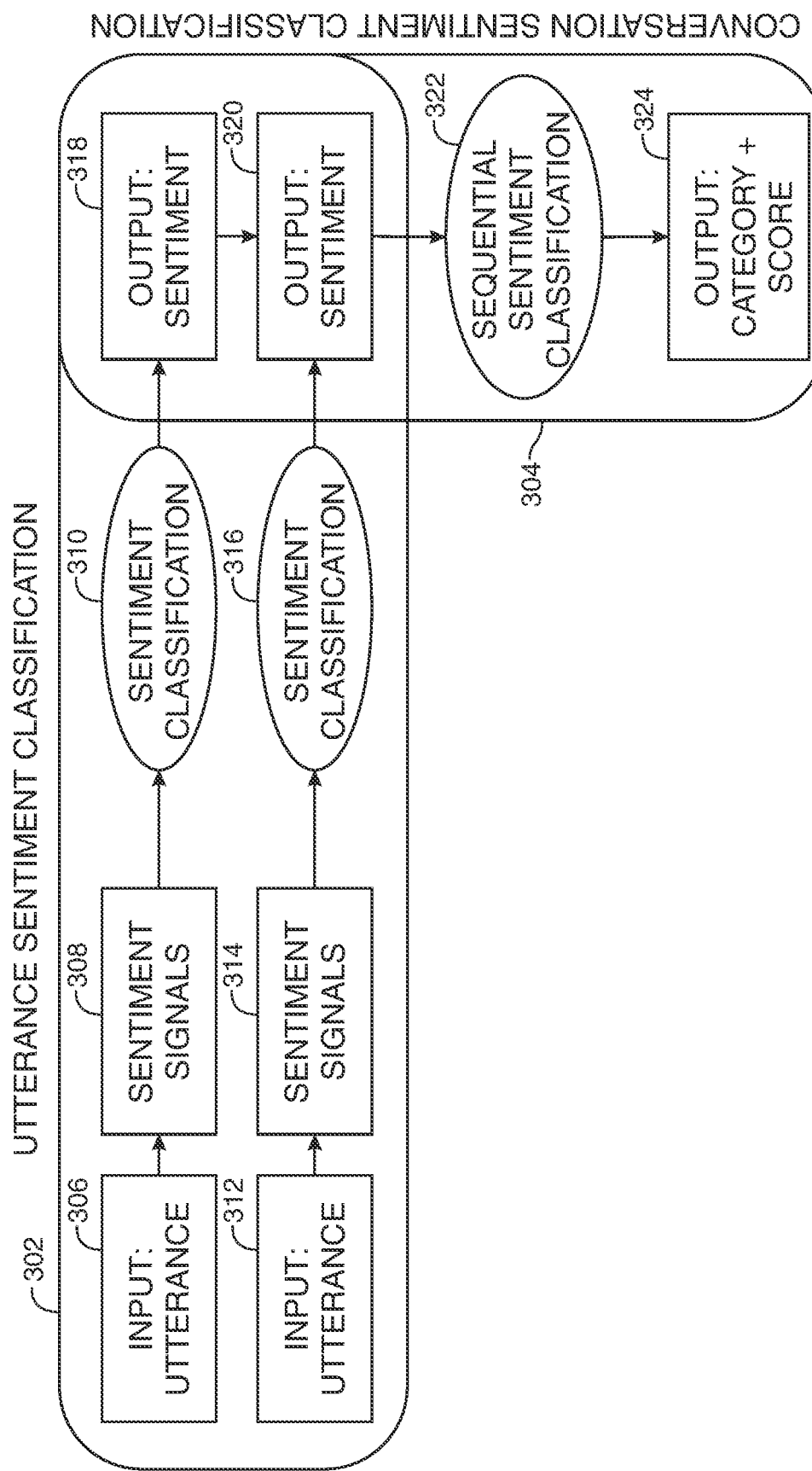
FIG. 3 shows an illustrative flow diagram in accordance with principles of the disclosure.

Apparatus for, and methods involving, an interactive voice response system are provided. The system may be used for interpreting sentiment and/or sentiment trajectory of a conversation in real time.

The interactive voice response system may include a receiver. The receiver may operate to receive a plurality of sentiment signals. The plurality of sentiment signals may include signals corresponding to emotions such as toxic, negation, rejection, urgent, mistake, lost, understand, affirm, shock, financial difficulty, disappointed, unemployment, family loss, health problem, repeated utterances, a partially repeated utterance, similar utterances, response-repeated, response-do not understand, response-still learning, response-cannot process and any other suitable sentiment signals corresponding to emotions.

The receiver may be operable to receive a first portion of a conversation. The first portion of the conversation may include a plurality of interaction pairs. Each interaction pair may include an utterance and a system response.

The interactive voice response system may also include an utterance sentiment category determination module. The utterance sentiment category determination module may determine an utterance sentiment category for each utterance included in the first portion of the conversation.

The utterance sentiment category determination module may include an assignment module. The assignment module may be operable to assign one or more sentiment signals to each utterance. The assigned sentiment signal may be selected from a plurality of sentiment signals.

The utterance sentiment category determination module may include a multi-class classifier operation module. The multi-class classifier operation module may be operable to execute a multi-class classifier operation for each utterance. The multi-class classifier operation may be executed on each one or more assigned sentiment signals associated with each utterance. An example of a multi-class classifier operation may be a maximum entropy classifier.

The multi-class classifier operation module may be operable to output an utterance sentiment category for the assigned sentiment signals associated with each utterance. Examples of utterance sentiments may include: DeclareProblem, Affirm, Rejection, Negation, Toxic, Mis-interpret, NeedHelp, EmpathyNeeded-financial difficulty, EmpathyNeeded-family loss, EmpathyNeeded- job loss, Normal and Resume.

It should be appreciated that each sentiment signal may correspond to an utterance sentiment. As such, multiple sentiment signals may correspond to the same utterance sentiment category. In order to determine the appropriate utterance sentiment category for each utterance, the sentiment signals selected for that utterance may be ranked based on the amount of times that specific sentiment signal appears. The sentiment signals may also be ranked based on importance, or any other suitable ranking rationale. The highest-ranking utterance sentiment category may be selected.

The multi-class classifier may be a maximum entropy classifier. The maximum entropy operation may be a function of all members of the plurality of sentiment signals that have been assigned to the plurality of utterances included in the first portion of the conversation.

The utterance sentiment category determination module may also include a sub-determination module. The sub-determination module may determine an utterance sentiment category for each utterance. The determination may be based on the execution of the multi-class classifier operation.

The interactive voice response system may also include a sequential module. The sequential module may be operable to determine a conversation sentiment category based on the determined utterance sentiment categories. Examples of conversation sentiment categories may include very negative, negative, empathy needed and normal. It should be appreciated that the utterance sentiment categories may map to conversation sentiment categories. Therefore, multiple utterance sentiment categories may map to a single conversation sentiment category. The sequential module may weigh the positions of the determined utterance sentiment categories in order to determine the conversation sentiment category.

The interactive voice response system may also include an output module. The output module may be operable to output the conversation sentiment category.

The receiver may also receive a second portion of the conversation. The second portion of the conversation may include a subsequent utterance. The system may include a response module. The response module may determine a response to the subsequent utterance. The response may be based at least in part on the conversation sentiment category.

In some embodiments, the interactive voice response system may include a plurality of predetermined interactive response modules. The interactive voice response system may route a caller, from which the first portion of the conversation is received, to one of the predetermined interactive response modules.

The predetermined interactive response modules may be selected based on the determined conversation sentiment category. For example, when the conversation sentiment category is negative, the predetermined interactive module may be a negative response module. When the conversation sentiment category is very negative, the predetermined interactive response module may be a very negative response module. When the conversation sentiment category is empathy needed, the predetermined interactive response module may be an empathy needed response module. When the conversation sentiment category is normal, the predetermined interactive response module may be a normal response module. In some embodiments, the normal response module may be the default response module.

A method for interpreting sentiment of a conversation in real time may also be provided. The method may include storing a plurality of sentiment signals. The plurality of sentiment signals may include toxic, negation, rejection, urgent, mistake, lost, understand, affirm, shock, financial difficulty, disappointed, unemployment, family loss, health problem, repeated utterances, partially repeated utterance, similar utterances, response-repeated, response-not understand, response-still learning, response-cannot process and any other suitable sentiment signals.

The method may include receiving a first portion of the conversation. The conversation may include a plurality of interaction pairs. Each interaction pair may include an utterance and a system response.

The method may include determining an utterance sentiment category for each utterance. The determining may include the following steps: assigning a sentiment signal to each utterance and determining an utterance sentiment category for each utterance.

Assigning a sentiment signal for each utterance may include selecting a sentiment signal from the plurality of sentiment signals for each utterance. The process of which sentiment signal to select may utilize artificial intelligence, natural language determination and processing and other suitable computer implemented selection processes.

Determining an utterance sentiment category for each utterance may include executing a multi-class classifier operation on the first portion of the conversation. The multi-class classifier operation may be a function of all members of the plurality of sentiment signals that have been assigned to the plurality of utterances included in the first portion of the conversation. The utterances sentiment category determined for each utterance may be a function of the multi-class classifier operation.

The method may include classifying the first portion of the conversation in one of a plurality of conversation categories. The classifying may be based on the identified utterance sentiment categories. The classifying may be executed by a sequential module. The sequential module may be operable to determine a conversation sentiment category based on the determined utterance sentiment categories. The sequential module may weigh the positions of the determined utterance sentiment categories within the first portion of the conversation in order to determine the conversation sentiment category.

The method may include outputting the conversation sentiment category that corresponds to the first portion of the conversation. The output may be transmitted to a response module. The response module may select a system response based on the conversation sentiment category.

It should be appreciated that the method may be executed after each portion of the conversation. For example, the method may be executed after the first utterance, after the first system response, after a second utterance and after a second system response. As such, the method may continually identify, in real time, the sentiment of the conversation.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows an example of a conversation score.

The interactive voice response system may determine a conversation to mean a series of interaction pairs. Each interaction pair may include an utterance and a system response. The following equation expresses the definition of a conversation.

$$\text{Conv}:=\{(U_1, R_1), (U_2, R_2), \ldots, (U_n, R_n)\} \quad \text{Equation A:}$$

Where $U_i$ is the $i_{th}$ utterance, $R_i$ is the $i_{th}$ response, and n is the length of the conversation. The total time may be referred to as n, and i as time step of the conversation.

Example 104 shows that an utterance may be received at an interactive voice response system. The utterance may be received in a textual format. The text received may include: I lost my debit card and requested a replacement. It arrived yesterday but my name is misspelled.

The utterance sentiment of example 104 may be: DeclareProblem. The conversation sentient of text 104 may be Normal. It should be appreciated that the conversation sentiment may be based in part on the one or more utterance sentiments included in a conversation. It should also be appreciated that the conversation sentiment may fluctuate during the course of the conversation.

Example 106 shows that an utterance may be received at an interactive voice response system. The utterance may be received in a textual format. The text received may include: Can I get a new replacement card overnighted to me?.

The utterance sentiment of example 106 may be: Normal. The conversation sentiment of example 106 may be Normal.

Example 108 shows that an utterance may be received at an interactive voice response system. The utterance may be received in a gesture format. The gesture received may include: Replace my card.

The utterance sentiment of example 108 may be: Normal. The conversation sentiment of example 108 may be Normal.

Example 110 shows that an utterance may be received at an interactive voice response system. The utterance may be received in a textual format. The text received may include: I just received a new replacement card but my last name is misspelled.

The utterance sentiment of example 110 may be: DeclareProblem. The conversation sentiment of example 110 may be Negative.

FIGS. 2A, 2B and 2C shows illustrative diagrams.

FIG. 2A shows table 202. Table 202 includes a plurality of sentiment signals. Table 202 shows that the source for the sentiment signals shown in table 202 are utterance sensitive words, features and/or concepts. Table 202 also shows examples of the sentiment signals. As shown at 204, an example of the sentiment signal—understand may be the utterance "I don't understand."

FIG. 2B shows table 206. Table 206 includes a plurality of sentiment signals. Table 206 shows that the source for the sentiment signals shown in table 206 are long utterances with emotions. Table 206 also shows examples of the sentiment signals.

FIG. 2C shows table 208. Table 208 includes a plurality of sentiment signals. Table 208 shows that the source for the sentiment signals shown in table 208 are customer repeat, response repeat and response negation/rejection. Table 208 also shows examples of the sentiment signals.

FIG. 3 shows an illustrative flow chart. The illustrative flow chart shows utterance sentiment classification flow, as shown at 302. The illustrative flow chart also shows conversation sentiment classification flow, as shown at 304.

Utterance sentiment classification flow 302 may include input 306. Input 306 may be an utterance. Sentiment signals 308 may be extracted from utterance input 306. Extracted sentiment signals 308 may be classified in sentiment classification 310. The output of the sentiment classification may be shown at 318.

Utterance sentiment classification flow 302 may also include input 312. Input 312 may be an utterance.

SUBSTITUTE SPECIFICATION-CLEAN COPY

Input 312 may be received after input 306. Sentiment signals 314 may be extracted from utterance input 312. Extracted sentiment signals 314 may be classified in sentiment classification 316. The output of the sentiment classification may be shown at 320.

Conversation sentiment classification flow 304 may input sentiment output 318 and sentiment output 320 into sequential sentiment classification processor 322. Sequential sentiment classification processor 322 may process the conversation sentiment based on the combination of output sentiment 318 and output sentiment 320. The outputted conversation sentiment may also be based on the order in which the output sentiments were received. The output of sequential sentiment classification processor 322 may be a conversation category and a score, as shown at 324. The category may be selected from a plurality of categories. The score may be a metric of the accuracy of the category.

Figure 4:
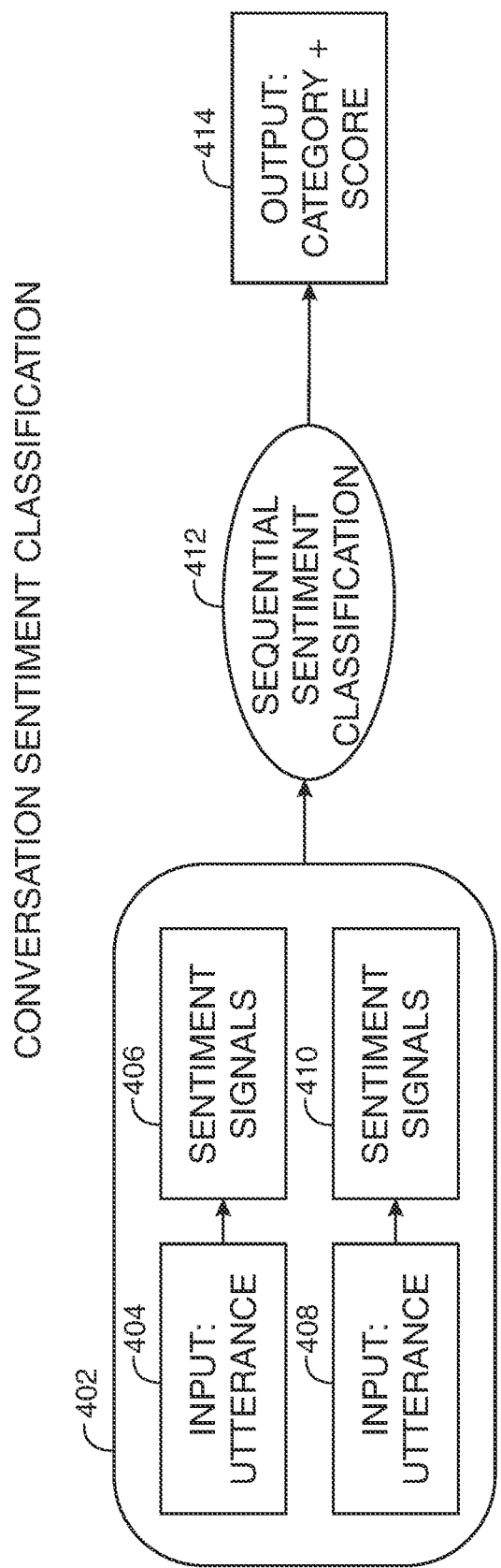
FIG. 4 shows another illustrative flow diagram in accordance with principles of the disclosure.

FIG. 4 shows another illustrative flow chart. The illustrative flow chart shows another framework in which a conversation may be classified and scored directly from the sequential list of sentiment signals. The illustrative flow chart includes input-sentiment box 402. Input-sentiment box 402 may include a plurality of inputs, such as utterance input 404 and utterance input 408. Input-sentiment box 402 may also include sentiment signals 406 and 410. Sentiment signals 406 may be extracted from utterance input 404. Sentiment signal 410 may be extracted from input utterance 408. The input and sentiment signal pairs may be received at sequential sentiment classification processor 412. Sequential sentiment classification processor 412 may classify the sentiment of each set of sentiment signals and classify the sentiment of the conversation. This framework may be a full deep learning framework that utilizes neural networks.

The output of sequential sentiment classification processor 412 may be a conversation category and a score, as shown at 414. The category may be selected from a plurality of categories. The score may be a metric of the accuracy of the category.

FIGS. 5A and 5B show an illustrative diagram. The illustrative diagram includes table 502. Table 502 begins on FIG. 5A and continues onto FIG. 5B. Table 502 shows key words that may be extracted from utterances. The key words may be sentiment signals or may correspond to categories. For example, the key word "understand" may correspond to the category understand, as shown at 506. It should be appreciated that signal extraction, such as table 502 may be the output of a deep learning system that received labeled training data. Signal extraction may be used to label incoming utterances.

FIG. 6 shows another illustrative diagram. The illustrative diagram shows an example of utterance sentiment classification result. The diagram shows utterance sentiment classification using an exemplary logistic regression utterance sentiment metrics. The logistic regression utterance sentiment metrics may be an exemplary sentiment classification applied for each utterance, such as the sentiment classification shown in elements 310 and 316 of FIG. 3.

FIG. 7 shows another illustrative diagram. The illustrative diagram shows conversation sentiment classification results. Conversation sentiment classification result may be final output after a sequential sentiment classification. Precision, recall, f1-score and support may be various performance metrics used to measure artificially intelligent algorithms. Each of the various performance metrics may be weighed against various conversation sentiments, such as negative and normal.

In addition, a micro average, macro average and weighted average may be used to measure the performance of the categories. Micro average may calculate metrics globally by counting the total true positives, false negatives and false positives. Macro average may calculate metrics for each label and find their unweighted mean. Macro average may not take label imbalance into account. Weighted average may calculate metrics for each label, and find their average weighted by support—i.e., the number of true instances for each label. The weighted average may alter the macro average to account for label imbalance. Therefore, it can result in an F-score that is not between precision and recall.

Figure 8:
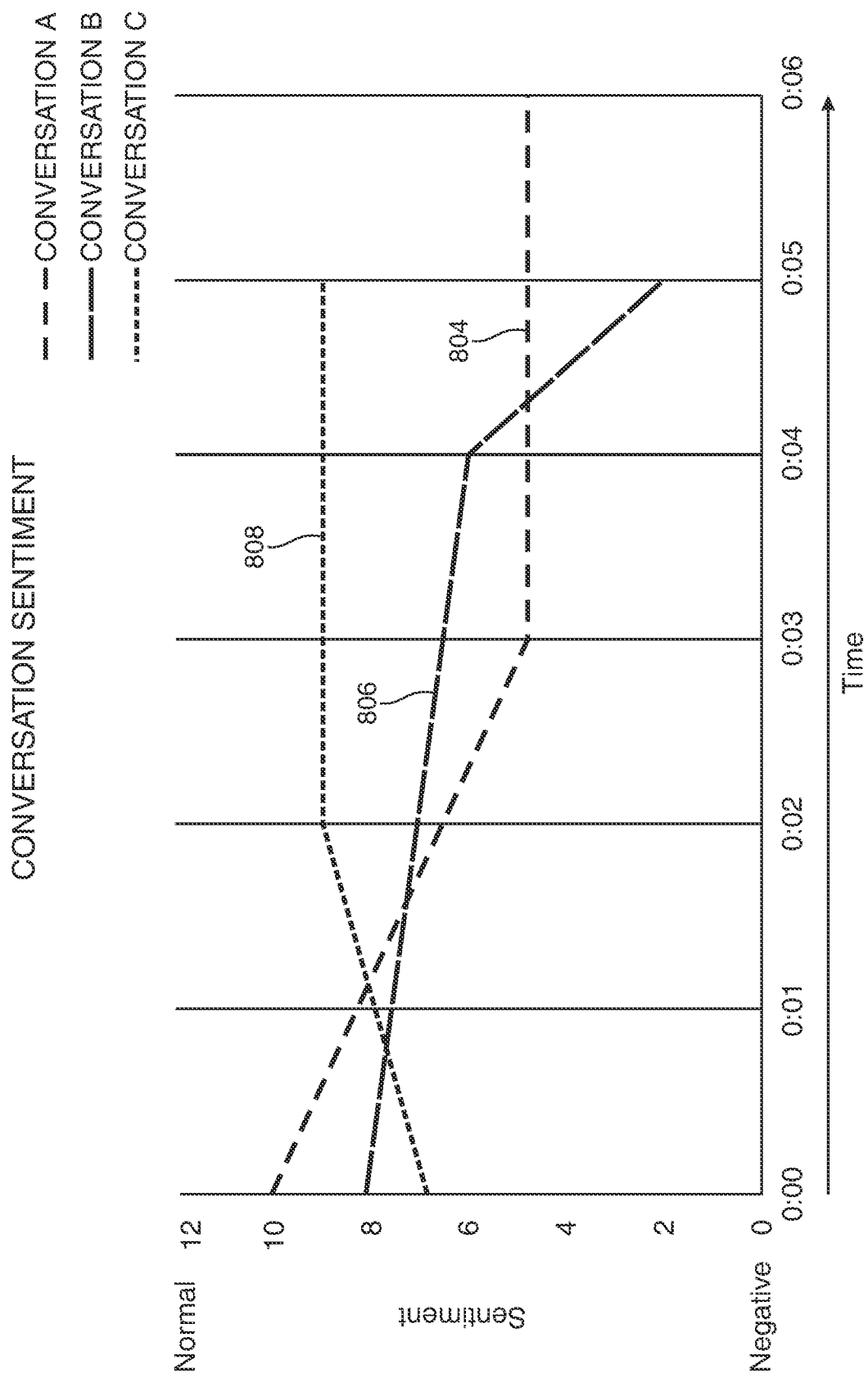
FIG. 8 shows another illustrative diagram in accordance with principles of the disclosure.

FIG. 8 shows another illustrative diagram. Graph 802 shows conversation sentiment trajectories. Graph line A, shown at 804, may correspond to a conversation. Graph line B, shown at 806, may correspond to a conversation. Graph line C, shown at 808, may correspond to a conversation.

Each point on each line of each graph may be the output of a conversation sentiment determination. For example, conversation A may begin at a score of 10 on a normal-negative sentiment scale of 1-10. At time=3, conversation A may drop to a conversation sentiment of 5. Conversation A may continue at a conversation sentiment of 6 until time=6, which may be the completion of conversation A. As such, the pivot point of conversation A, or the point in which the conversation sentiment of conversation A is lowered for a period of time and maintains the lowered sentiment, may be time=3. Therefore, in order to determine what went wrong in the conversation, the analysis may focus on what took place around time=3.

Conversation B may begin at a score of 8 on a normal-negative sentiment scale of 1-10. At time=4, conversation B may drop to a conversation sentiment of 6. At time=5, conversation B may drop to a conversation sentiment of 2, which may be the completion of conversation B. As such, the pivot point of conversation B, or the point in which the conversation sentiment B is lowered for a period of time and maintains the lowered sentiment, or decreases in sentiment, may be time=4. Therefore, in order to determine what went wrong in the conversation, the analysis may focus on what took place around time=4.

Conversation C may begin at a score of 7 on a normal-negative sentiment scale of 1-10. At time=2, conversation C may be elevated to a sentiment score of 9. At time=5, conversation C may maintain the sentiment score of 9. As such, the pivot point in which conversation C became more normal and less negative may be time=2. As such, in order to determine what satisfied the caller, and thereby made the conversation more normal, analysis may be performed on time=2.

Thus, an interactive voice response system with a real time conversation scoring module is provided. persons skilled in the art will appreciate that the present invention can be practiced by other than the described embodiments, which are presented for purposes of illustration rather than of limitation. the present invention is limited only by the claims that follow.

What is claimed is:

1. A method for interpreting sentiment of a conversation in real-time, the method comprising:
   storing a plurality of sentiment signals;
   receiving a first portion of the conversation, said conversation being defined as Conv:={($U_1$, $R_1$), ($U_2$, $R_2$), . . . , ($U_n$, $R_n$)}, where Cony is a conversation, U is an utterance and R is a system response, $U_i$ is the ith utterance, and $R_i$ is the ith system response;
   for each utterance included in the conversation, determining an utterance sentiment category, said determining comprising:
      assigning a sentiment signal to each utterance, said assigned sentiment signal being selected from the plurality of sentiment signals; and
      determining an utterance sentiment category for each utterance by executing a multi-class classifier operation on the assigned sentiment signal;
   based on the identified utterance sentiment categories, classifying the first portion of the conversation in one of a plurality of conversation sentiment categories using a sequential module; and
   outputting a conversation sentiment category that corresponds to the first portion of the conversation.

2. The method of claim 1, wherein the first portion of the conversation is received, from a caller, at an interactive voice response system, and based on the conversation sentiment category, the caller is routed to a predetermined interactive response module.

3. The method of claim 2, wherein the conversation sentiment category is very negative, negative, empathy needed or normal.

4. The method of claim 3, wherein, when the conversation sentiment category is very negative, the predetermined interactive response module is a very negative response module.

5. The method of claim 3, wherein, when the conversation sentiment category is negative, the predetermined interactive response module is a negative response module.

6. The method of claim 3, wherein, when the conversation sentiment category is empathy needed, the predetermined interactive response module is an empathy needed response module.

7. The method of claim 3, wherein, when the conversation sentiment category is normal, the predetermined interactive response module is a normal response module.

8. The method of claim 1, wherein the sentiment signals comprise negation, rejection, mistake, urgent request, affirmation, empathy needed, repetition, total repetition, similar utterances, partial repetition, previous response, previous intent, previous intent status and previous input.

9. An interactive voice response system for interpreting sentiment of a conversation in real-time, the interactive voice response system comprising:
   a receiver operable to receive:
      a plurality of sentiment signals; and
      a first portion of a conversation, said conversation being defined as Conv:={$(U_1, R_1), (U_2, R_2), \ldots, (U_n, R_n)$}, where Conv is a conversation, U is an utterance and R is a system response, $U_i$ is the ith utterance, and $R_i$ is the ith system response;
   an utterance sentiment category determination module, said utterance sentiment category determination module comprising:
      an assignment module, said assignment module operable to assign a subset of the plurality of sentiment signals to each utterance;
      a multi-class classifier operation module, said multi-class classifier operation module operable to execute a multi-class classifier operation on each assigned subset of the plurality of sentiment signals; and
      a sub-determination module that determines an utterance sentiment category for each utterance based on the execution of the multi-class classifier operation;
   a sequential module operable to determine a conversation sentiment category based on the determined utterance sentiment categories and an order of the utterance sentiment categories; and
   an output module operable to output the conversation sentiment category.

10. The interactive voice response system of claim 9, wherein:
   the receiver receives a second portion of the conversation, said second portion of the conversation comprising a subsequent utterance; and
   the system further comprises a response module, and the response module determines a response to the subsequent utterance, the response being based at least in part on the conversation sentiment category.

11. The interactive voice response system of claim 9, wherein the sequential module determines the conversation sentiment category based on weighing the positions of the determined utterance sentiment categories within the first portion of the conversation.

12. The interactive voice response system of claim 9, further comprising a plurality of predetermined interactive response modules, wherein:
   the first portion of the conversation is received from a caller; and
   based on the conversation sentiment category, the interactive voice response system routes the caller to a predetermined interactive response module, selected from the plurality of predetermined interactive response modules.

13. The method of claim 12, wherein the conversation sentiment category is very negative, negative, empathy needed or normal.

14. The method of claim 13, wherein, when the conversation sentiment category is very negative, the predetermined interactive response module is a very negative response module.

15. The method of claim 13, wherein, when the conversation sentiment category is negative, the predetermined interactive response module is a negative response module.

16. The method of claim 13, wherein, when the conversation sentiment category is empathy needed, the predetermined interactive response module is an empathy needed response module.

17. The method of claim 13, wherein, when the conversation sentiment category is normal, the predetermined interactive response module is a normal response module.

18. The method of claim 9, wherein the sentiment signals comprise negation, rejection, mistake, urgent request, affirmation, empathy needed, repetition, total repetition, similar utterances, partial repetition, previous response, previous intent, previous intent status and previous input.

* * * * *